Figure 1:
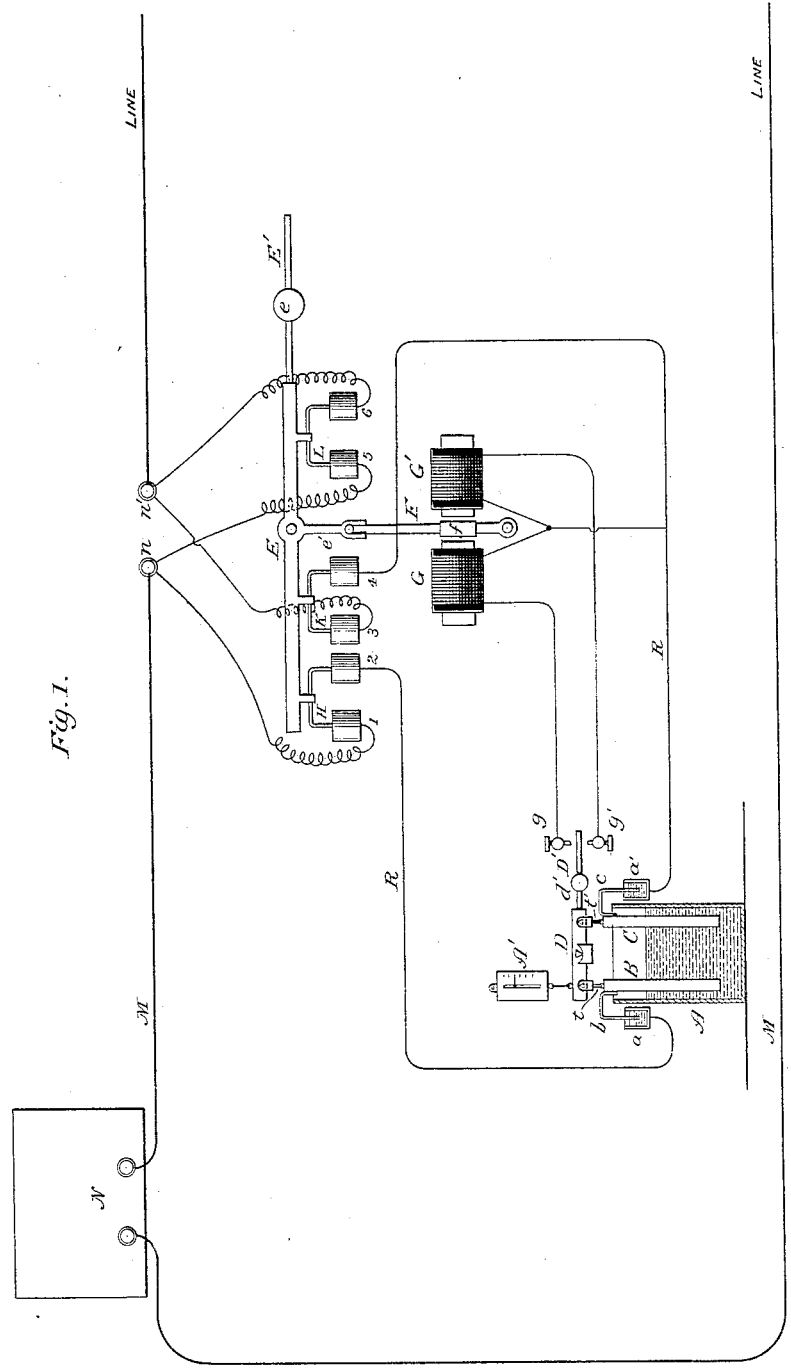

(No Model.) 2 Sheets—Sheet 1.

E. WESTON & L. E. CURTIS.
APPARATUS FOR CHARGING AND DISCHARGING SECONDARY BATTERIES.
No. 289,328. Patented Nov. 27, 1883.

Attest:
Raymond F. Barnes.
W. Frisby

Inventors:
Edward Weston
Leonard E. Curtis
by Parker W. Page
Atty.

N. PETERS. Photo-Lithographer, Washington, D. C.

(No Model.) 2 Sheets—Sheet 2.
E. WESTON & L. E. CURTIS.
APPARATUS FOR CHARGING AND DISCHARGING SECONDARY BATTERIES.
No. 289,328. Patented Nov. 27, 1883.
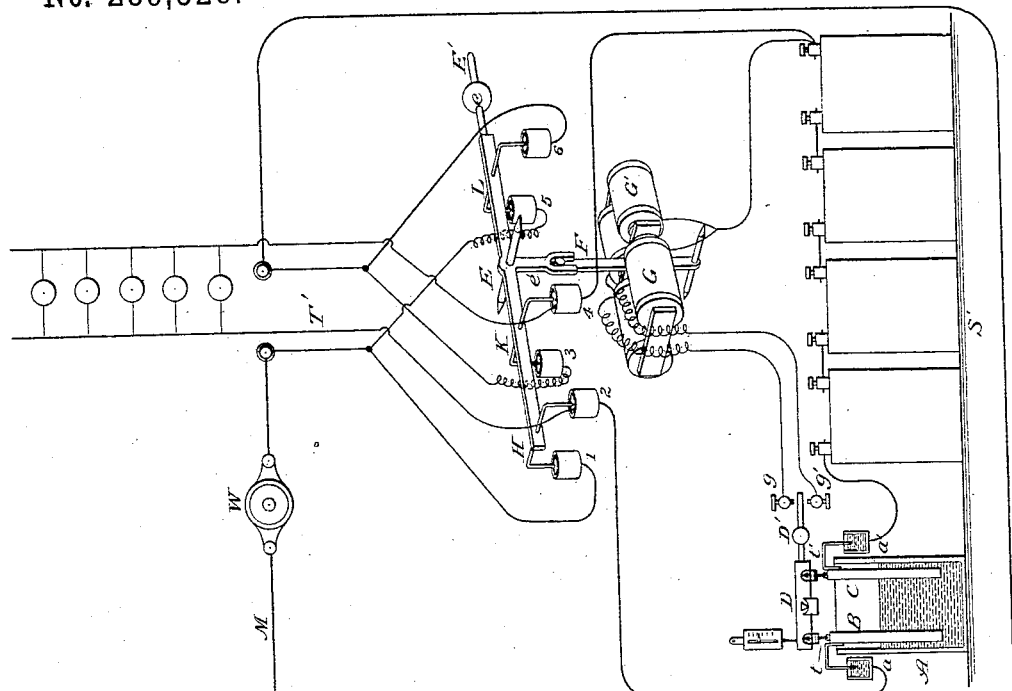
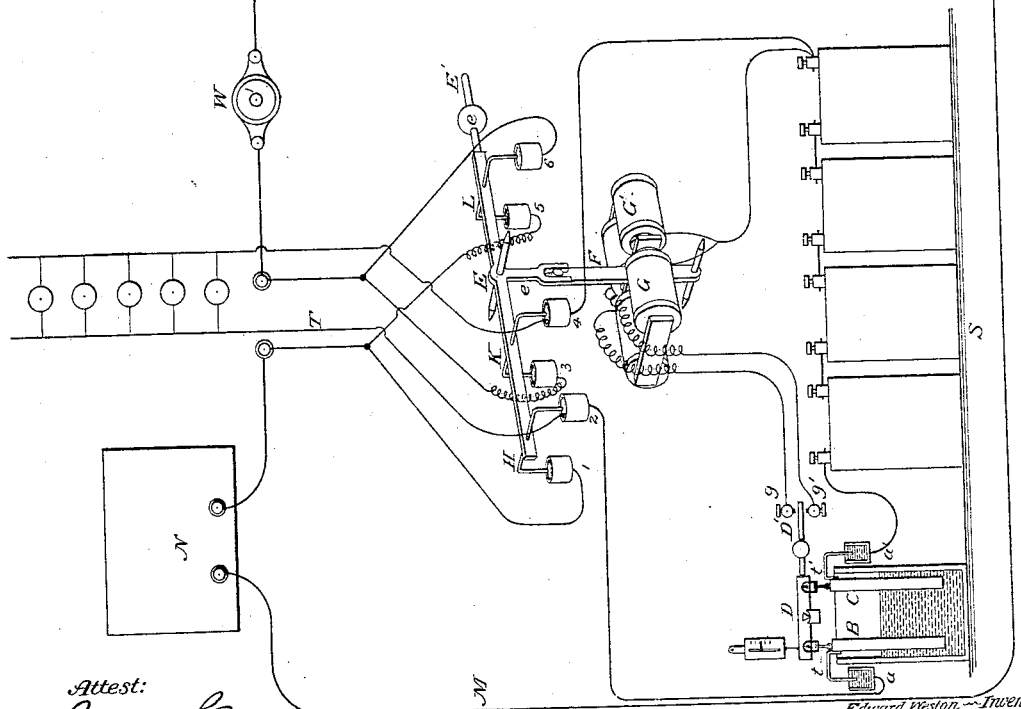
Fig. 2.
Attest:
Raymond F. Barnes.
W. Frisby.
Edward Weston — Inventor.
Leonard E. Curtis —
by Parker W. Page Atty.
N. PETERS. Photo-Lithographer, Washington, D. C.

UNITED STATES PATENT OFFICE.

EDWARD WESTON, OF NEWARK, NEW JERSEY, AND LEONARD E. CURTIS, OF NEW YORK, N. Y.

APPARATUS FOR CHARGING AND DISCHARGING SECONDARY BATTERIES.

SPECIFICATION forming part of Letters Patent No. 289,328, dated November 27, 1883.

Application filed February 23, 1883. (No model.)

*To all whom it may concern:*

Be it known that we, EDWARD WESTON, a subject of the Queen of Great Britain, and a resident of Newark, in the county of Essex and State of New Jersey, and LEONARD E. CURTIS, a citizen of the United States, residing in New York, in the county and State of New York, have invented certain new and useful Improvements in Apparatus for Charging and Discharging Secondary Batteries, of which the following is a specification, reference being had to the drawings accompanying and forming a part of the same.

When the current from a dynamo-machine or other generator of electricity is passed through a secondary or storage battery cell, it is charged or brought to the condition of polarization by the absorption by its elements of the gases of decomposition. The capacity of absorption, though varying greatly in different species of cell, is comparatively limited, owing to many causes, and it is well known that if the current continue to flow after the time that the absorption ceases the gases are set free and a waste of energy results. It is therefore desirable to disconnect the cell or battery from the charging-circuit as soon as or even before it has received its full charge; and when the battery is located at a distance from the generator, or when several batteries are charged from the same circuit, it is particularly desirable that this be effected automatically. Heretofore this has been done by the aid of auxiliary circuits, or by devices whose operation depends upon the varying resistance or counter electro-motive force of the cells.

The object of our present invention is to accomplish this in a more simple and effective manner than has yet been done, and to provide an automatic cut-out or controlling-switch which shall be more reliable and certain in its action than those referred to.

During the intervals of charging of secondary batteries—such, for example, as those containing elements composed of lead plates—a variation in the weight or specific gravity of the elements takes place, the tendency of the plates being to rise or sink, according to their respective gain or loss in weight or specific gravity. We have found that when the two elements of a cell are suspended from the opposite ends of a balanced beam the most positive movement is obtained, the hydrogen or negative plate overbalancing the positive or oxygen plate during charging, and conversely. This occurs notwithstanding an actual gain in the weight of the positive plate on being charged, for the reason that it loses in specific gravity, while that of the hydrogen-plate increases.

In carrying out our invention we take advantage of these changes, and combine with the electrodes of a cell, when arranged to move in accordance with variations in weight and specific gravity, mechanism constructed to operate in consequence of such movement and to act as a switch or cut-out. In this combination our invention is mainly comprised, though it also includes improvements in the specific character of the switch mechanism and its application to general systems.

We will describe our invention by reference to the drawings, where Figure 1 illustrates, mainly in diagram, a simple and practicable application of the invention to a single cell;
and Fig. 2, the invention as applied to a number of secondary batteries independently located with respect to one another and to the generator.

A simple means of utilizing the variation in the relative weights and specific gravities of the plates is shown in Fig. 1. A is a secondary-battery cell; B C, the plates or elements; D, a beam from which the plates are suspended; D', a metallic extension of beam D, carrying an adjustable counterpoise, d', and A' is a light spring-balance attached to the end of the beam, from which hangs the negative or hydrogen plate B of the cell. In order that the cell may be charged and discharged without interfering with the free movement of the electrodes B C, bent wires b c may be connected to the plates and caused to dip into mercury-cups a a'. To these cups the line-wires for charging or discharging are connected.

Before charging, the counterpoise d' is adjusted to bring the beam D into a horizontal position. If a current be then passed through the cell from the cup a to the cup a', the plate or electrode B absorbs the hydrogen and the element C takes up the oxygen evolved by the decomposition of the battery-liquid. In consequence of this action the plate B overbalances the plate C and gradually sinks in the liquid, drawing out the spring-balance A' and tilting the beam D. The movement thus imparted to the beam D may be utilized in a great variety of ways for directing the charging-circuit through or around the cell, or for other and similar purposes. For example, it may be caused to shift the position of contact-levers on such devices or be used to close a circuit containing or controlling suitable switch mechanism. The latter plan we prefer, and for this purpose employ any suitable devices, of which one form is illustrated in the drawings.

E is a pivoted lever; E', an arm extending from one end, and provided with an adjustable counterpoise, e. An arm, e', extends from the pivotal point of the lever, and is connected by an extension-joint with a vibrating armature-lever, F, carrying an armature, f. Electro-magnets G G' are placed on opposite sides of the armature. Magnet G is included in a circuit from the cup a' of the battery-cell to an adjustable contact-stop, g, placed above the arm D'. Magnet G' is in a circuit from cup a' to a similar stop, g', placed below arm D'. Independent circuits may be used instead of these, if so desired; but it is not necessary, as by insulating the plate C from the beam and maintaining a metallic connection between plate B and the arm D' the current from the cell, or the charging-current, may be caused to operate the magnets G or G' when the arm D' touches either stop g or g'.

On one side of the fulcrum of lever E are arranged two pairs of mercury-cups, 1 2 3 4. On the opposite side is a single pair, 5 6. In these cups are arranged to dip the ends of V-shaped metal arms H K L, attached to the beam E. The plan of connection is seen in the diagram.

The letter M designates the circuit from a generator, N. At n this circuit is branched, one branch carried to cup 1, the other to cup 5. A continuation of the circuit is branched at n', one branch leading from cup 3, the other from cup 6.

R is a circuit including the battery-cell, and it starts at cup 2 and ends at cup 4.

Suppose a current be passed through the circuit M, and that the lever E be tilted into a position where arms H and K dip into the mercury in the cups below them, while arm L is raised above the mercury in cups 5 and 6. The current will therefore flow through the battery-cell A, causing plate B to descend. When the cell has received the desired charge, which may be determined by the adjustment of the stop g, the arm D' encounters stop g, closes the circuit through magnet G, and shifts the position of lever E, so that the circuit M will be made through the arm L and cups 5 6—in other words, around instead of through the cell A. If the cell be then discharged, the plate B rises until arm D' encounters stop g', when the lever E is tilted back and brings the cell again into the charging-circuit.

This invention may be applied to a general system in which a number of secondary batteries or groups of cells are employed, in conjunction with isolated plants or circuits containing electrical devices of any kind.

Referring to Fig. 2, M represents the circuit from any generator, R. S S' are batteries composed of a number of cells, that are employed for supplying current to electrical devices, such as incandescent lamps contained in local or isolated circuits T T'. The batteries S S' may be charged in series from the circuit M, and this circuit may also be used to run arc-lamps, as W, or other devices.

In order that the current may not pass through the batteries longer than is necessary to charge them, the circuit M is severed and branched near each battery and the branches connected to the cups of switch mechanisms, similar in all respects to that shown in Fig. 1. To operate these switches, it is only necessary to depend upon the variations in weight and specific gravity of the plates of one cell of each group, since the condition of all the cells of a group when charged or discharged in series is the same. In this as in the previous case one plate, as B, is in electrical connection with the arm D' by means of a metallic connection, t. The other plate, C, is insulated from the beam and arm D' by an insulated connection, t'. The circuits in which the magnets G G' are included may be formed from the stops g g' to the cups a', or to any other point in the series of cells. Under this arrangement, when any one of the batteries S S' reaches the desired condition of saturation, the contact of the arm D' with the upper stop, g, causes the lever E, connected with such battery, to change position, thereby directing the current in the circuit M around the battery until its charge is exhausted, when it will be again brought into the circuit M.

The local or battery circuits may be in constant connection with the battery by taking off the wires from the cups 2 and 4; or they may be connected with the battery only at times when the latter is not being charged. In the former case the current, when the local circuit is closed, divides between it and the battery, so that the lamps or other devices may be kept running while the battery is being charged.

An important and novel result is attained by the devices constructed and operating in the manner specified—viz., that the battery, by the action of the switch alone and without the intervention of other devices or circuits, is connected with the charging-circuit after its charge has been expended, as well as disconnected when it has received its charge. This is not possible with any form of switch heretofore known.

The specific character of the batteries or cells may be greatly varied; but, although any ordinary form of cell may be used, we prefer to use lead plates in an acidulated solution, such as are described and shown in an application of Edward Weston of even date herewith.

With reference to the switch mechanism or the devices which are employed in conjunction with the plates, it may be stated again that the invention is not restricted to any special form. In general the plates may be suspended or arranged in any manner that permits to them a movement proportionate to the change of weight and specific gravity which they undergo.

The differences of weight and specific gravity may be rendered available for accomplishing other purposes than those enumerated herein—as for indicating, by means of mechanism of proper construction, the amount of charge in the battery at any given time for registering the amounts of current applied and expended, or for other purposes; but these are matters which are elsewhere described and claimed, and are not included in the present application. We reserve, however, the right to make separate application for features of novelty herein shown or described but not claimed.

What we claim as our invention is—

1. The combination, with the electrodes of a secondary battery capable of a movement due to changes in weight or specific gravity, of switch or circuit controlling mechanism constructed to operate in consequence of such movement, substantially as set forth.

2. The combination, with the electrodes of a secondary battery suspended or balanced, as set forth, of a switch or circuit controlling mechanism constructed or arranged to be brought into operation by a movement of said electrode or electrodes, as described.

3. The combination, with a secondary-battery cell, of a balanced beam or lever, plates or electrodes suspended therefrom, and a switch or circuit controlling mechanism constructed to be brought into operation by movements of the beam imparted to it by changes in the weight or specific gravity of the electrodes, as set forth.

4. The combination, with a suspended or balanced electrode or electrodes of a secondary-battery cell, of a switch for directing a current through or around said cell, electro-magnets for operating said switch, and circuits including the magnets, which are opened or closed by the movement of the electrode or electrodes, as herein described.

5. The combination, of a charging-circuit, a group or groups of secondary-battery cells, the electrodes of one cell of each group being suspended or balanced in the manner described, and switch or circuit controlling mechanism connected with said cells and constructed or arranged to be brought into operation by the movement of the suspended or balanced electrodes, and thereby connect or disconnect the groups of cells from the charging-circuit, as and for the purpose set forth.

6. The combination, with a secondary-battery cell, the balanced beam D, counterpoise $d'$, spring-balance $A'$, and electrodes B C, of a switch or circuit controlling mechanism constructed or arranged to be brought into operation by the movement of beam D, as and for the purpose specified.

7. The balanced lever E, arms H K L, mercury-cups into which said arms dip, and electro-magnets for shifting the position of said lever, in combination with a secondary-battery cell, suspended or balanced electrodes contained therein, and circuit-connection and contact-stops, arranged as described, whereby the position of the lever E is changed by movements of the electrodes in the cell, as herein set forth.

In testimony whereof we have hereunto set our hands this 19th day of February, 1883.

EDWARD WESTON.
LEONARD E. CURTIS.

Witnesses for Edward Weston:
   HENRY A. BECKMEYER,
   L. V. E. INNES.
Witnesses for Leonard E. Curtis:
   HENRY HINE,
   W. H. DOGGETT.